(12) United States Patent
Morita et al.

(10) Patent No.: US 10,734,819 B2
(45) Date of Patent: Aug. 4, 2020

(54) POWER TRANSMISSION AND RECEPTION CONTROL DEVICE, METHOD FOR CONTROLLING TRANSMISSION AND RECEPTION OF POWER, POWER TRANSMISSION AND RECEPTION CONTROL SYSTEM

(71) Applicant: Sony Corporation, Tokyo (JP)

(72) Inventors: Tadashi Morita, Tokyo (JP); Annette Werth, Tokyo (JP)

(73) Assignee: Sony Corporation, Tokyo (JP)

( * ) Notice: Subject to any disclaimer, the term of this patent is extended or adjusted under 35 U.S.C. 154(b) by 88 days.

(21) Appl. No.: 15/325,126

(22) PCT Filed: Jul. 8, 2015

(86) PCT No.: PCT/JP2015/003440
§ 371 (c)(1),
(2) Date: Jan. 10, 2017

(87) PCT Pub. No.: WO2016/009619
PCT Pub. Date: Jan. 21, 2016

(65) Prior Publication Data
US 2017/0163051 A1   Jun. 8, 2017

(30) Foreign Application Priority Data
Jul. 17, 2014   (JP) .................................. 2014-146611

(51) Int. Cl.
*H02J 7/00*        (2006.01)
*H02J 7/35*        (2006.01)
(Continued)

(52) U.S. Cl.
CPC .............. *H02J 7/0021* (2013.01); *H02J 1/10* (2013.01); *H02J 7/007* (2013.01); *H02J 7/34* (2013.01); *H02J 7/35* (2013.01); *H02J 1/106* (2020.01)

(58) Field of Classification Search
CPC .. H02J 7/0021; H02J 7/35; H02J 7/007; H02J 7/00
(Continued)

(56) References Cited

U.S. PATENT DOCUMENTS 7,587,465 B1 * 9/2009 Muchow ............... G06F 9/5061
709/208
9,543,763 B2   1/2017 Sako et al.
(Continued)

FOREIGN PATENT DOCUMENTS

CN   102545200 A    7/2012
EP   2 061 131 A1   5/2009
(Continued)

OTHER PUBLICATIONS

U.S. Appl. No. 13/680,748, filed Nov. 19, 2012, Sako et al.
(Continued)

*Primary Examiner* — Richard Isla
*Assistant Examiner* — Dung V Bui
(74) *Attorney, Agent, or Firm* — Wolf, Greenfield & Sacks, P.C.

(57) ABSTRACT

A method of operating a first battery server for use with a first node of a power interchange system that distributes direct current (DC) power between nodes, wherein each node of the nodes comprises a storage battery to store electrical energy and a battery server to control transmission of DC power from the storage battery of the node to one or more other nodes and to control receipt of DC power at the node from one or more storage batteries of one or more other
(Continued)

nodes. The method comprises, in response to detecting that a state of charge of the first storage battery and/or a usage rate of power satisfies one or more conditions, requesting that a master node of the power interchange system control transmission of power from another node of the nodes to the first node, wherein the master node is one of the nodes.

19 Claims, 8 Drawing Sheets

(51) Int. Cl.
  *H02J 7/34* (2006.01)
  *H02J 1/10* (2006.01)
(58) Field of Classification Search
  USPC .......................................................... 320/101
  See application file for complete search history.

(56) References Cited

U.S. PATENT DOCUMENTS

| | | | |
|---|---|---|---|
| 10,158,228 B2 | 12/2018 | Kawamoto et al. | |
| 10,447,045 B2 | 10/2019 | Morita | |
| 2005/0078422 A1 | 4/2005 | Pincu et al. | |
| 2005/0080516 A1 | 4/2005 | Pincu et al. | |
| 2005/0081069 A1 | 4/2005 | Pincu et al. | |
| 2005/0146219 A1 | 7/2005 | Pincu et al. | |
| 2005/0156432 A1* | 7/2005 | Hennessy | F03D 9/00 290/44 |
| 2010/0023174 A1 | 1/2010 | Nagata et al. | |
| 2010/0181957 A1 | 7/2010 | Goeltner | |
| 2011/0080044 A1 | 4/2011 | Schmiegel | |
| 2011/0082598 A1* | 4/2011 | Boretto | G06Q 10/06 700/291 |
| 2011/0089760 A1* | 4/2011 | Castelaz | H02J 4/00 307/25 |
| 2011/0140648 A1* | 6/2011 | Lee | H02J 3/32 320/101 |
| 2011/0302078 A1* | 12/2011 | Failing | B60L 3/00 705/39 |
| 2012/0074901 A1* | 3/2012 | Mohammed | H02J 7/045 320/109 |
| 2012/0091965 A1* | 4/2012 | Seo | G06F 1/26 320/128 |
| 2012/0119586 A1 | 5/2012 | Carralero et al. | |
| 2012/0153722 A1* | 6/2012 | Nazarian | H02J 3/32 307/23 |
| 2012/0173035 A1 | 7/2012 | Abe | |
| 2012/0206104 A1* | 8/2012 | Tsuchiya | H02J 3/32 320/134 |
| 2012/0267952 A1 | 10/2012 | Ballantine et al. | |
| 2012/0323396 A1* | 12/2012 | Shelton | H02J 3/381 700/297 |
| 2012/0326668 A1 | 12/2012 | Ballatine et al. | |
| 2013/0088084 A1 | 4/2013 | Szu | |
| 2013/0138256 A1 | 5/2013 | Sako et al. | |
| 2013/0197710 A1* | 8/2013 | Hansen | H02J 7/0013 700/297 |
| 2014/0067151 A1* | 3/2014 | Erhart | G05F 1/66 700/297 |
| 2014/0077596 A1* | 3/2014 | Nishibayashi | H02J 1/00 307/29 |
| 2016/0248261 A1 | 8/2016 | Tokuda et al. | |
| 2016/0329744 A1 | 11/2016 | Werth et al. | |
| 2017/0229861 A1 | 8/2017 | Kawamoto et al. | |
| 2017/0373510 A1 | 12/2017 | Morita | |
| 2018/0224914 A1 | 8/2018 | Morita | |
| 2018/0278083 A1 | 9/2018 | Andre et al. | |

FOREIGN PATENT DOCUMENTS

| | | |
|---|---|---|
| EP | 2477297 A1 | 7/2012 |
| JP | 2004-310569 A | 11/2004 |
| JP | 2006-288162 A | 10/2006 |
| JP | 2011-061970 A | 3/2011 |
| JP | 2011-205871 A | 10/2011 |
| JP | 2012-060760 A | 3/2012 |
| JP | 2013-090560 A | 5/2013 |
| JP | 2013-143825 A | 7/2013 |
| JP | 2013-247792 A | 12/2013 |
| JP | 2014-060855 A | 4/2014 |
| JP | 2017-077172 A | 4/2017 |
| WO | WO 2004/036399 A2 | 4/2004 |
| WO | WO 2014/020644 A1 | 2/2014 |

OTHER PUBLICATIONS

U.S. Appl. No. 15/108,706, filed Jun. 28, 2016, Werth et al.
U.S. Appl. No. 15/501,024, filed Feb. 1, 2017, Kawamoto et al.
Abe et al., Digital Grid: Communicative Electrical Grids of the Future, IEEE Transactions on Smart Grid, vol. 2, No. 2, Jun. 2011, pp. 399-410.
European Office Action dated Feb. 14, 2018 in connection with European Application No. 15741609.0.
No Author Listed, Sony Computer Science Laboratories, Inc., (Sony CSL), Open Energy Systems, Research Gallery, retrieved on May 16, 2018 noting date of Mar. 27, 2015, https://web.archive.org/web/20150327075359/http://www.sonycsl.co.jp/en/research_gallery/open-energy-system.html, 3 pages.
European Office Action dated Sep. 11, 2018 in connection with European Application No. 15751111.4.
U.S. Appl. No. 15/544,967, filed Jul. 20, 2017, Morita.
U.S. Appl. No. 15/580,326, filed Dec. 7, 2017, Morita.
U.S. Appl. No. 15/544,990, filed Jul. 20, 2017, Andre et al.
International Search Report and Written Opinion dated Nov. 5, 2015 in connection with International Application No. PCT/JP2015/003891.
International Search Report and Written Opinion dated Oct. 5, 2015 in connection with International Application No. PCT/JP2015/003440.
International Search Report and English translation thereof dated Feb. 24, 2015 in connection with International Application No. PCT/JP2014/084290.
International Preliminary Report on Patentability dated Feb. 23, 2017 in connection with International Application No. PCT/JP2015/003891.
International Preliminary Report on Patentability dated Jan. 26, 2017 in connection with International Application No. PCT/JP2015/003440.
Written Opinion and English translation thereof dated Feb. 24, 2015 in connection with International Application No. PCT/JP2014/084290.
International Preliminary Report on Patentability and English translation thereof dated Jul. 21, 2016 in connection with International Application No. PCT/JP2014/084290.
Japanese Office Action and English translation thereof dated Jul. 18, 2017 in connection with Japanese Application No. 2014-146611.

* cited by examiner

[Fig. 1]
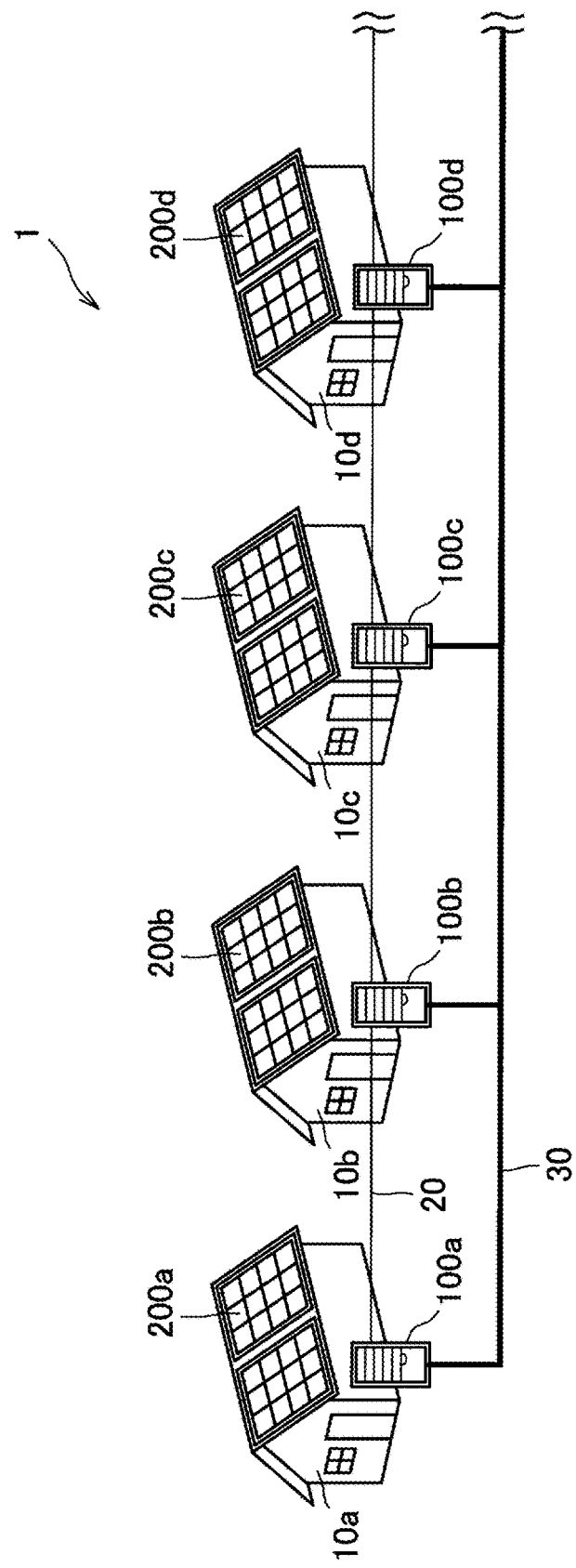

[Fig. 2]
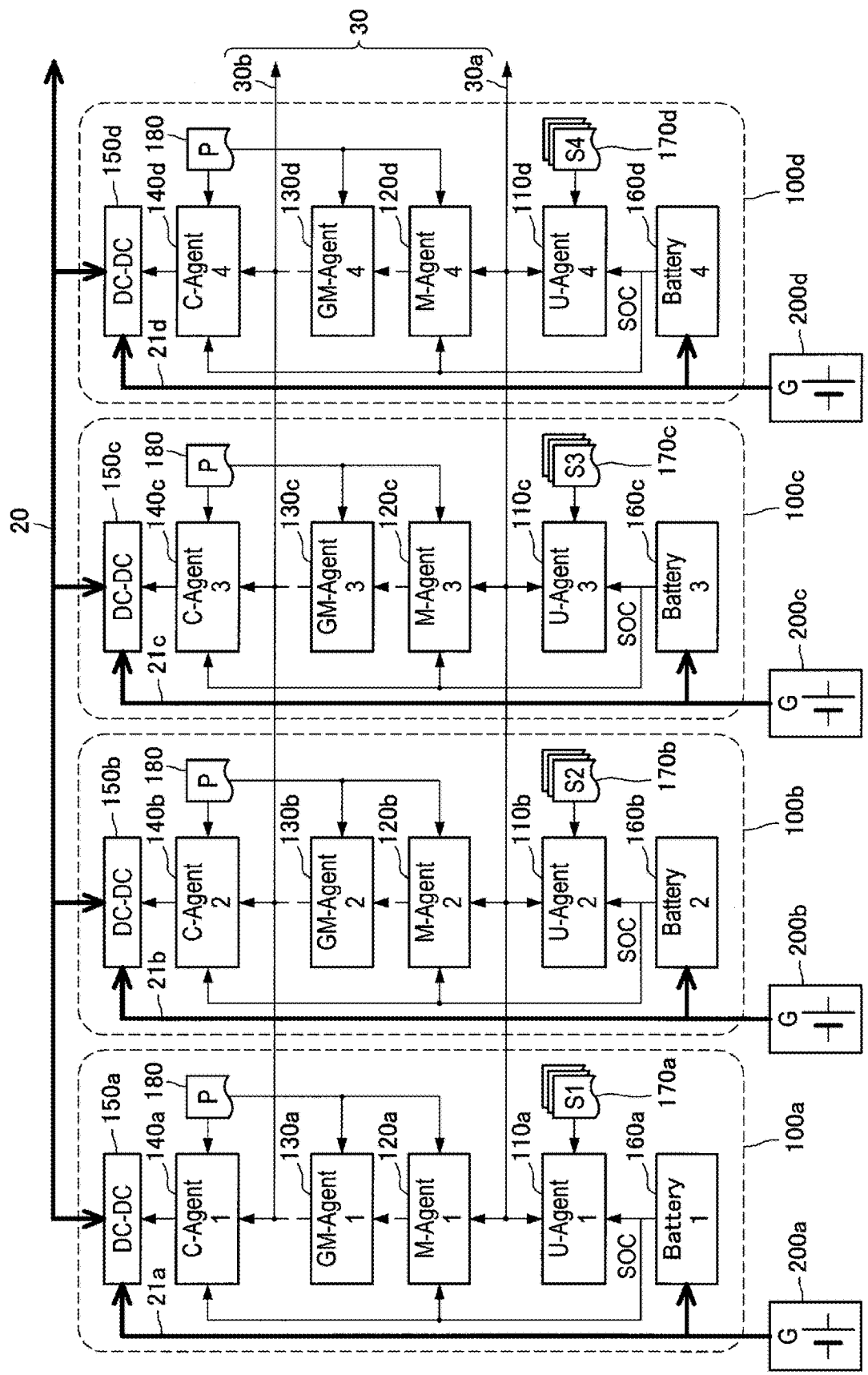

[Fig. 3]
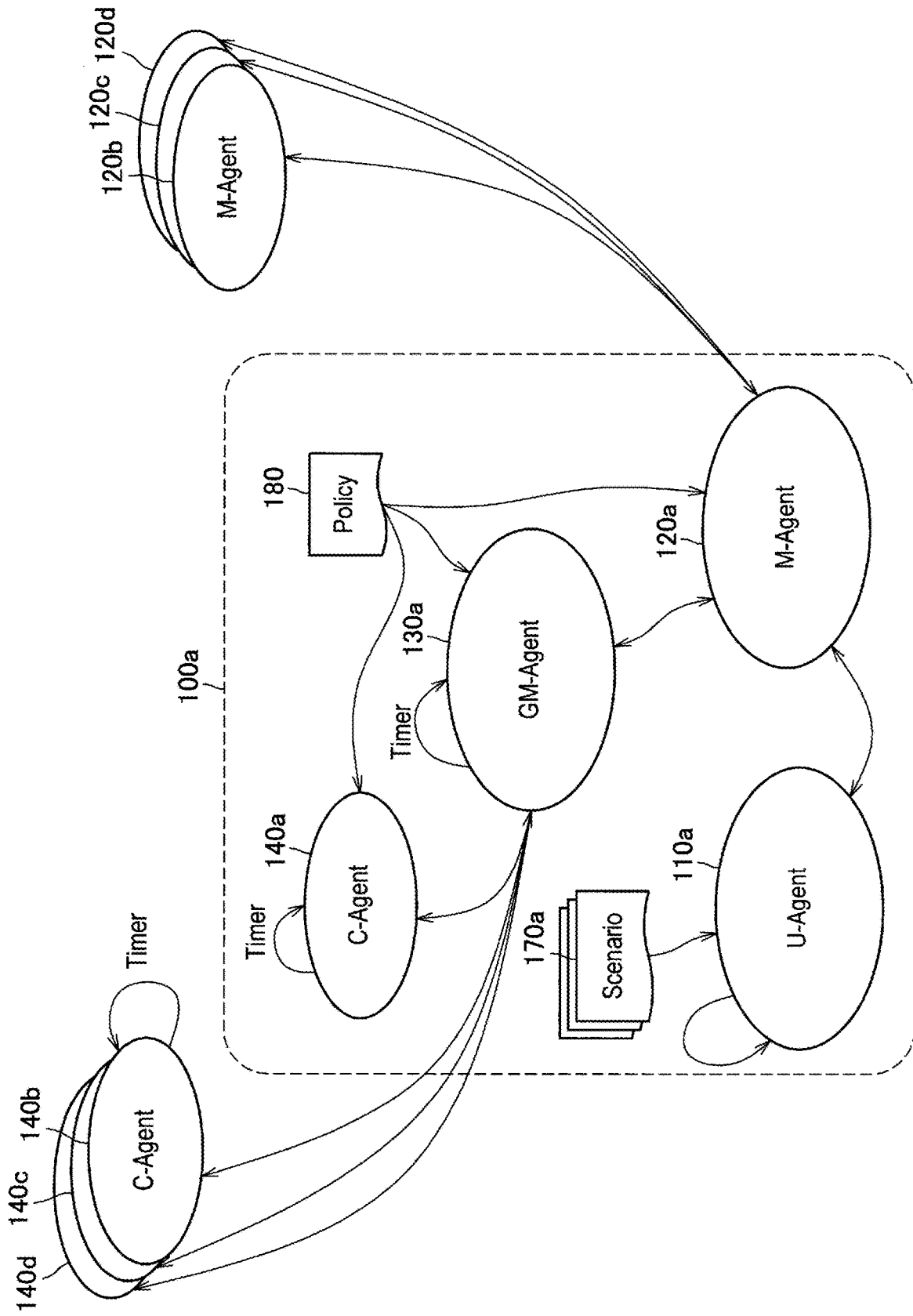

[Fig. 4]
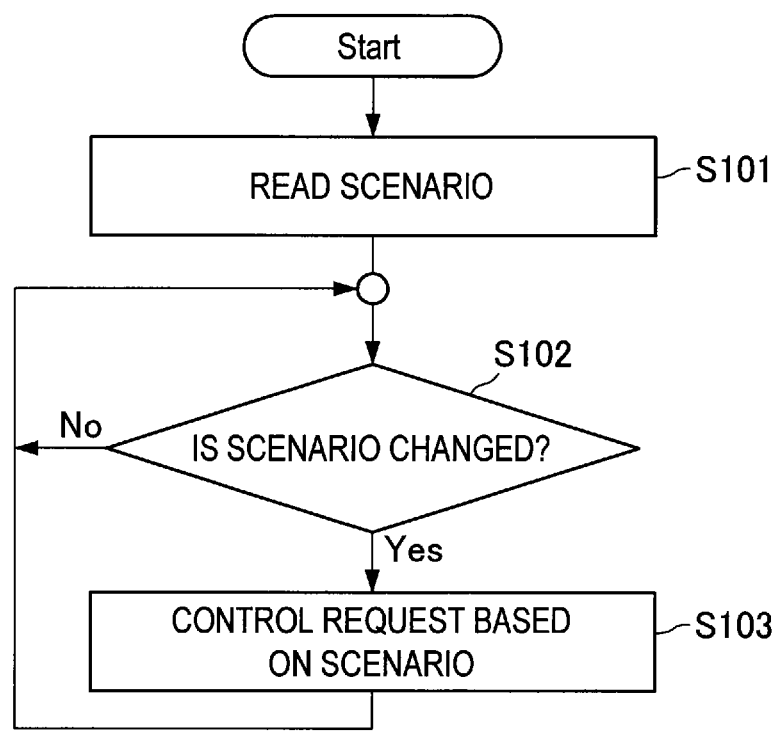

[Fig. 5]
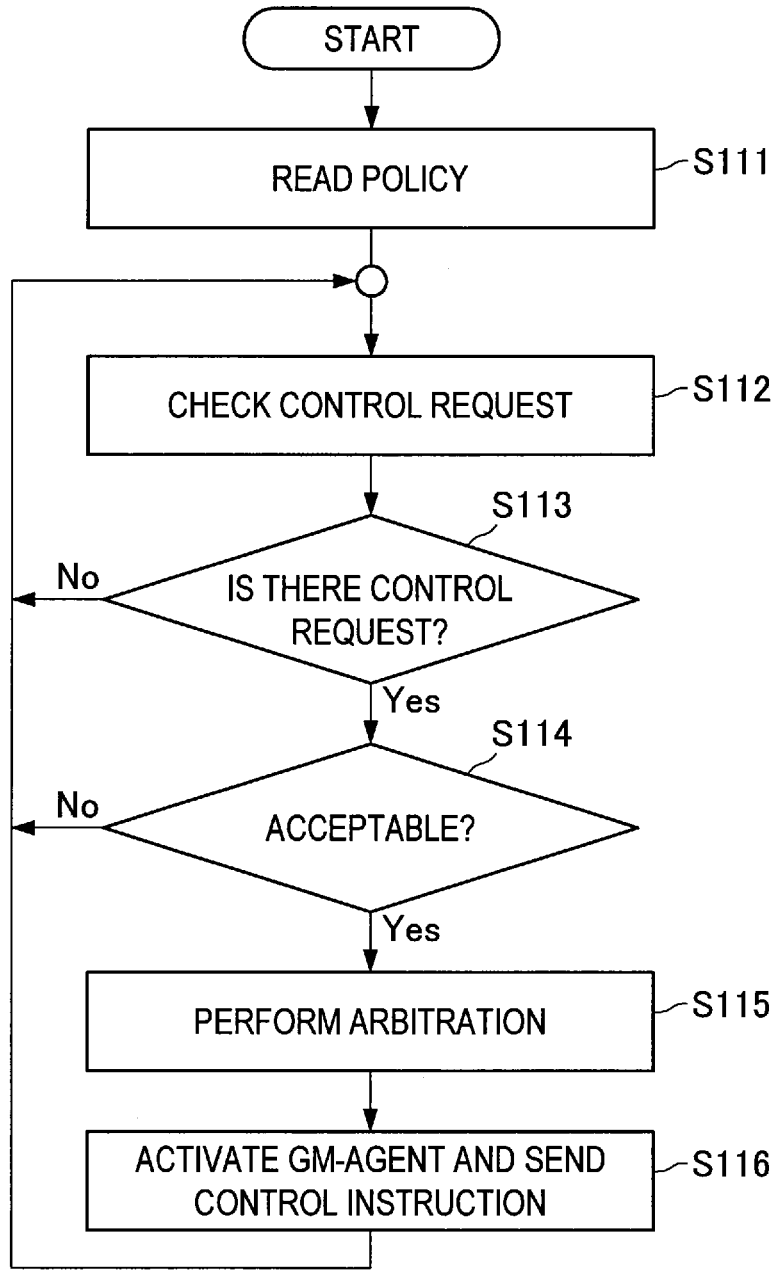

[Fig. 6]
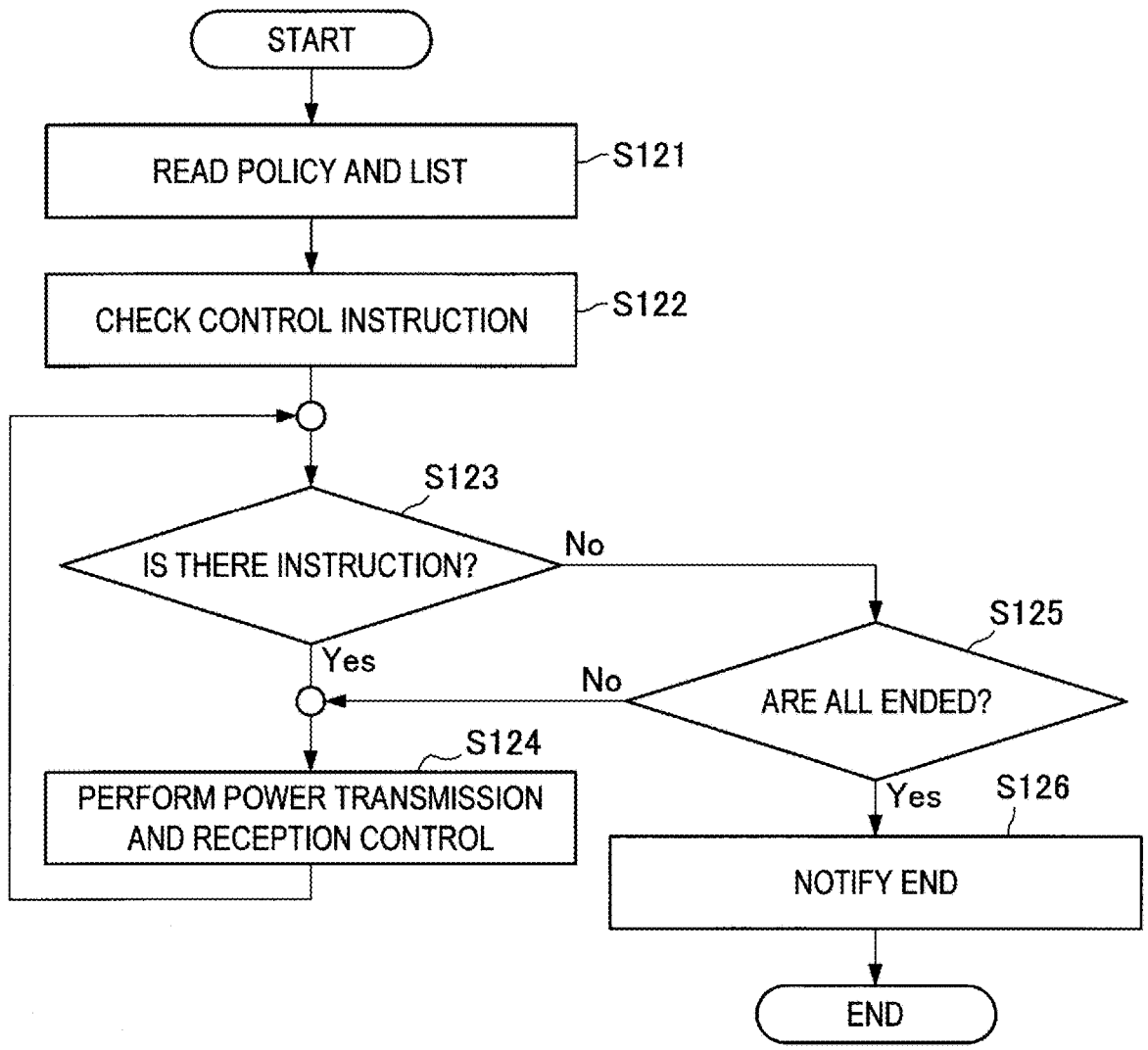

[Fig. 7]
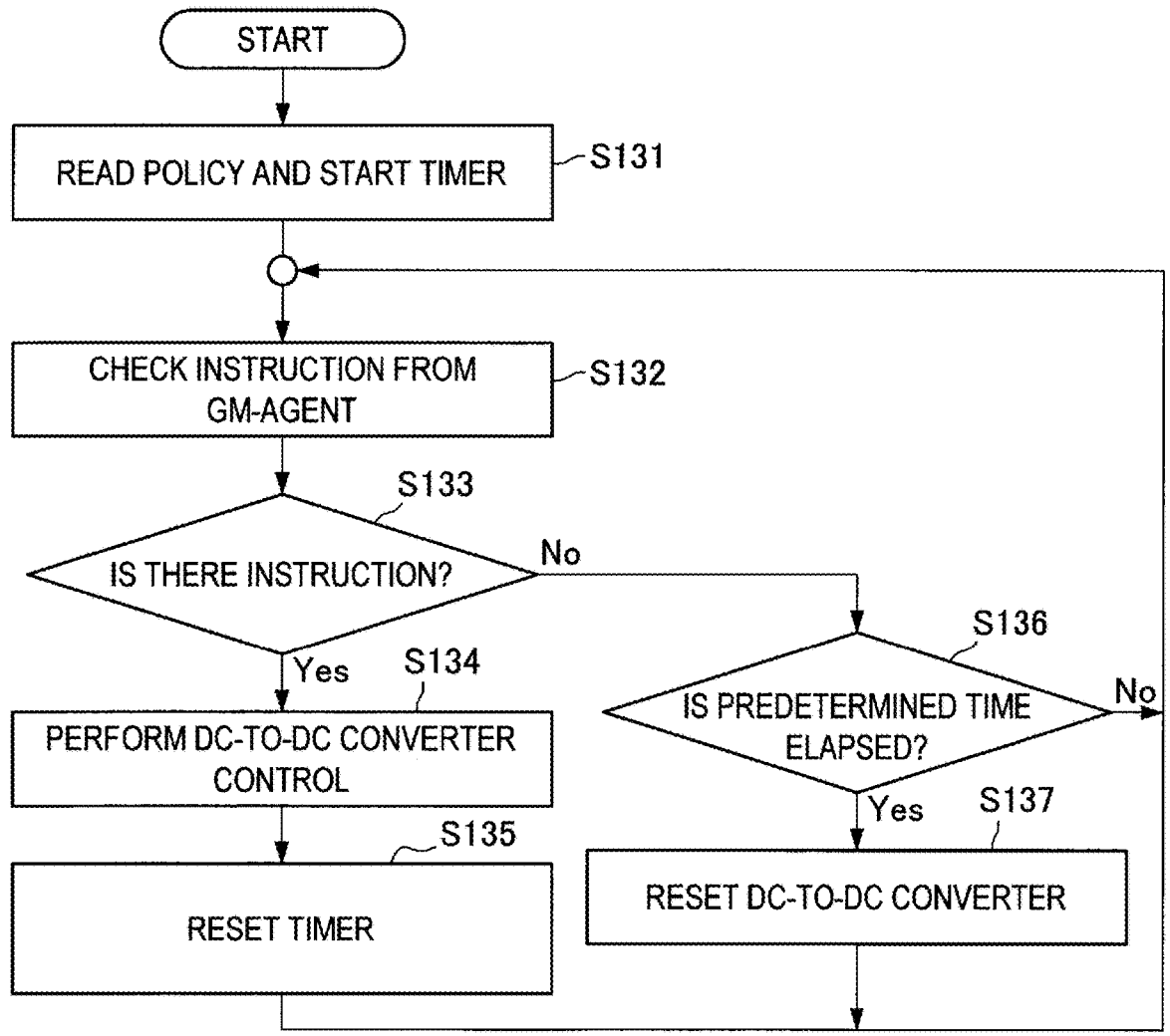

[Fig. 8]
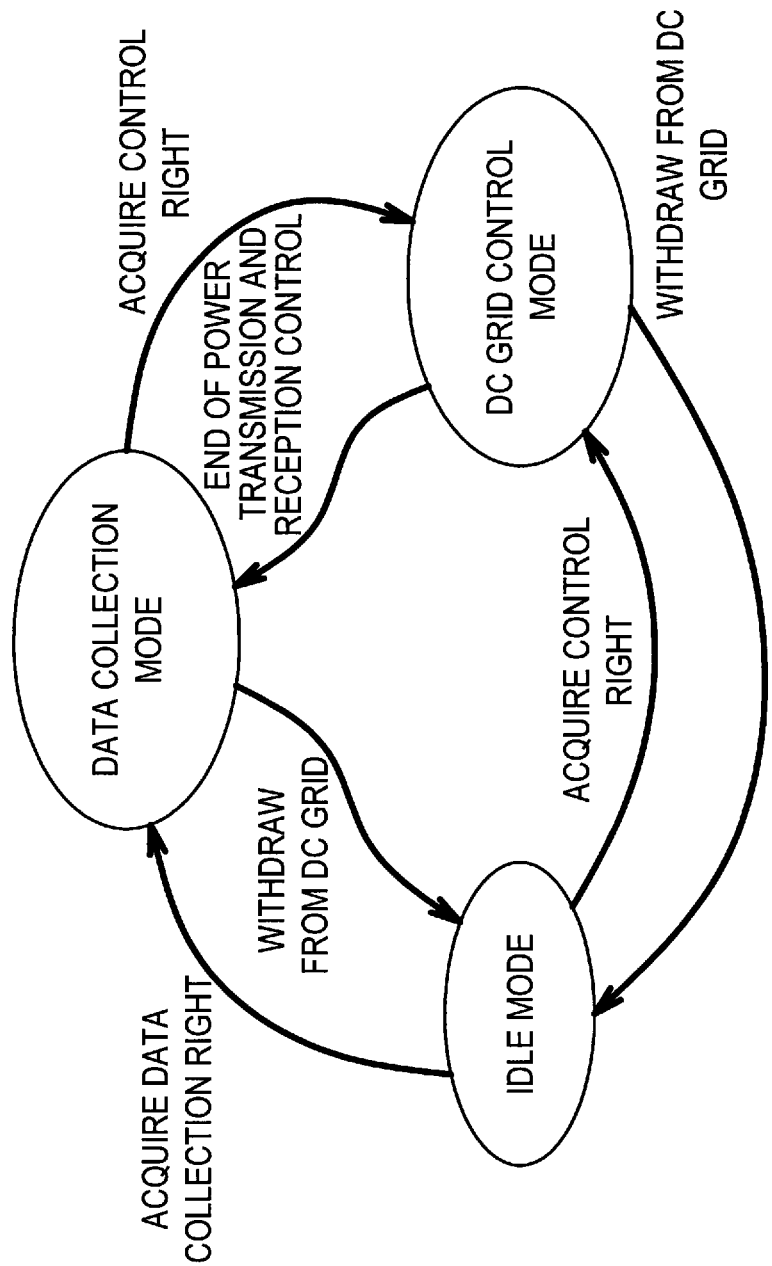

POWER TRANSMISSION AND RECEPTION CONTROL DEVICE, METHOD FOR CONTROLLING TRANSMISSION AND RECEPTION OF POWER, POWER TRANSMISSION AND RECEPTION CONTROL SYSTEM

CROSS REFERENCE TO RELATED APPLICATIONS

This application claims the benefit of Japanese Priority Patent Application JP 2014-146611 filed Jul. 17, 2014, the entire contents of which are incorporated herein by reference.

TECHNICAL FIELD

The present disclosure relates to a power transmission and reception device, a method for controlling transmission and reception of power, and a power transmission and reception control system.

BACKGROUND ART

There is known an uninterruptible power supply provided with a storage battery for continuing to provide power from the storage battery to equipment connected thereto for a predetermined time without causing power failure even when the power from an input power source is interrupted. Techniques are developed for extending such a power supply into each consumer and supplying power to the consumers when an abnormality occurs in supplying power due to power failure, shortage of storage battery capacity, or other reasons (see PTLs 1 and 2).

CITATION LIST

Patent Literature

PTL 1: JP 2011-205871A
PTL 2: JP 2013-090560A

SUMMARY

Technical Problem

When consumers supply power to each other, it is desirable, for the sake of efficiency, to supply direct-current power in consideration of supply of power from a storage battery. However, if a consumer transmits direct-current power without any permission or instruction, the power will not be properly transmitted to a target receiver of power. Thus, it is desirable to efficiently manage the right to control the transmission and reception of direct-current power.

Therefore, according to an embodiment of the present disclosures, there is provided a novel and improved power transmission and reception device, method for controlling transmission and reception of power, and power transmission and reception control system, capable of efficiently managing the right to control the transmission and reception of direct-current power, when direct-current power is interchanged among consumers.

Solution to Problem

In one embodiment, there is provided a method of operating a first battery server for use with a first node of a power interchange system that distributes direct current (DC) power between a plurality of nodes. Each node of the plurality of nodes comprises a storage battery to store electrical energy and a battery server to control transmission of DC power from the storage battery of the node to one or more other nodes and to control receipt of DC power at the node from one or more storage batteries of one or more other nodes. The method comprises monitoring a state of charge in a first storage battery of the first node and a usage rate of power by one or more electrical components of the first node and, in response to detecting that the state of charge of the first storage battery and/or the usage rate of power satisfies one or more conditions, requesting that a master node of the power interchange system control transmission of power from another node of the plurality of nodes to the first node. The master node is one of the plurality of nodes.

In another embodiment, there is provided a battery server for use with a first node of a power interchange system that distributes direct current (DC) power between a plurality of nodes. The battery server comprises a storage battery to store electrical energy, at least one processor, and at least one computer-readable storage medium having encoded thereon executable instructions that, when executed by the at least one processor, cause the at least one processor to carry out a method. The method comprises monitoring a state of charge in the storage battery and a usage rate of power by one or more electrical components of the first node and, in response to detecting that the state of charge of the storage battery and/or the usage rate of power satisfies one or more conditions, requesting that a master node of the power interchange system control transmission of power from another node of the plurality of nodes to the first node, wherein the master node is one of the plurality of nodes.

In a further embodiment, a power interchange system for distributing direct current (DC) power between a plurality of nodes. The power interchange system comprises a power bus interconnecting the plurality of nodes, a first node of the plurality of nodes comprising a first battery server, a first storage battery, and first electrical components; and a second node of the plurality of nodes comprising a second battery server, a second storage battery, and second electrical components. The first battery server is programmed to carry out acts of monitoring a state of charge in a first storage battery of the first node and a usage rate of power by one or more first electrical components of the first node and, in response to detecting that the state of charge of the first storage battery and/or the usage rate of power by the one or more first electrical components satisfies one or more conditions, requesting that a master node of the power interchange system control transmission of power from another node of the plurality of nodes to the first node, wherein the master node is one of the plurality of nodes.

Advantageous Effects of Invention

According to one or more of embodiments of the present disclosure as described above, it is possible to provide a novel and improved power transmission and reception device, method for controlling transmission and reception of power, and power transmission and reception control system, capable of efficiently managing the right to control the transmission and reception of direct-current power, when direct-current power is interchanged among consumers.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrated to describe an overall configuration example of a power transmission and reception control system according to an embodiment of the present disclosure.

FIG. 2 is a diagram illustrated to describe a functional configuration example of the power transmission and reception control system according to an embodiment of the present disclosure.

FIG. 3 is a diagram illustrated to describe an example of a task.

FIG. 4 is a flowchart illustrating an exemplary operation of a U-Agent 110a.

FIG. 5 is a flowchart illustrating an exemplary operation of an M-Agent 120a.

FIG. 6 is a flowchart illustrating an exemplary operation of a GM-Agent 130a.

FIG. 7 is a flowchart illustrating an exemplary operation of a C-Agent 140a.

FIG. 8 is a diagram illustrated to describe a mode transition example of a GM-Agent.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Embodiment of present Disclosure
1.1. Overview
1.2. Exemplary System Configuration
1.3. Exemplary Operation
2. Conclusion

1. EMBODIMENT OF PRESENT DISCLOSURE (1.1. Overview)

An overview of an embodiment of the present disclosure will be described prior to the description of an embodiment of the present disclosure.

The description is based on the assumption that an environment becomes increasingly popular in which each consumer is provided with a battery server having a storage battery, the storage battery stores power using a commercial power supply or power generated from a natural energy source such as solar, wind, and geothermal, and the power stored in the storage battery drives electrical appliances. With the spread of such environment, a power interchange system is designed for interchanging power between consumers, as described above. When power is insufficient in a battery server of a consumer, the power interchange system allows a battery server of a consumer having extra power to supply power to the battery server of the consumer having insufficient power. When consumers supply power to each other, it is preferable, for the sake of efficiency, to supply direct-current power in consideration of the supply of power from a storage battery.

However, if consumers transmit direct-current power from their battery servers without any permission or instruction, the power will not be properly transmitted to a target receiver of power. Thus, it is desirable to efficiently manage the right to control the transmission and reception of direct-current power to and from a battery server. From the point of view of management of the control right, there is considered a method of mutually interchanging the direct-current power among consumers by sharing the roles of a battery server between a master and a slave. The master controls operations of all of the battery servers connected to a direct-current power grid that transmits direct-current power from a consumer, and a slave is operated in accordance with the instructions of the master.

The battery server acting as a master sets a voltage of a direct-current power grid, and transmits direct-current power from the master or requests a slave to transmit direct-current power, thereby transmitting direct-current power to a target receiver of power. When roles are shared between a master and a slave in this way, for example, there is considered a method of allowing a battery server acting as a master to be set to keep its role as a master, or setting a battery server that first responds to a request from a consumer in which the power is insufficient as a master.

However, if a battery server acting as a master is set to keep its role as a master, a load is concentrated on the battery server, thereby causing an imbalance. When a battery server acting as a master is stopped for any reason, the transmission and reception of direct-current power between consumers will be not allowed. After a battery server acting as a master requests a battery server acting as a slave to transmit power to the battery server acting as a master, if the slave stops transmitting power or starts receiving power for reasons such as a change in the mind of the user in the slave consumer in spite of a promise to transmit power by the slave, it is considered that there is a phenomenon where the slave which has started receiving power may take the stored power from the battery server acting as a master, or the voltage of the direct-current power grid may vary significantly.

When a battery server acting as a master is requested to transmit and receive power between battery servers acting as a slave, if the battery server acting as a slave changes the amount of power transmission or reception, or switches from power transmission to power reception, for reasons such as a change in the user's mind similarly as described above, it is considered that there is a phenomenon where the battery server acting as a master should take responsibility for the difference caused by the change or switching, and thus a significant load may be applied to the battery server acting as a master.

When a battery server acting as a slave is stopped for reasons such as failure, if a battery server acting as a master does not recognize the stop, it is considered that there is a phenomenon where an instruction to the slave is made unable to function and thus it will no longer be able to control the direct-current power grid, or the stored power may be taken from the battery server acting as a master.

When the grid is connected with a device, which is not authorized for connection or is not intended to be connected thereto, the device is not under the control of a master, and thus it is considered that there is a phenomenon where the device receives power from the grid without any permission or sends a command for control to other battery servers without being asked for it, thereby throwing the grid into confusion.

When the user of each battery server wants to find out the state of all devices connected to the grid, if each battery server sends a request for information to a network individually, it may be considered that there is a phenomenon where the network is in congestion thereby causing problems with appropriate operations of the system.

The present inventors have made extensive studies to achieve a technology capable of managing efficiently the right to control the transmission and reception of direct-current power while avoiding the occurrence of phenomena as described above. As a result, the present inventors have developed the technology capable of managing efficiently the right to control the transmission and reception of direct-current power while avoiding the occurrence of phenomena as described above.

An overview of an embodiment of the present disclosure has been described. Next, a functional configuration example of the power transmission and reception control system according to an embodiment of the present disclosure will be described.

(1.2. Exemplary System Configuration)

FIG. 1 is a diagram illustrated to describe an overall configuration example of the power transmission and reception control system according to an embodiment of the present disclosure. FIG. 1 illustrates an overall configuration example of the power transmission and reception control system that interchanges direct-current power between battery servers having their own storage batteries. An overall configuration example of the power transmission and reception control system according to an embodiment of the present disclosure will be described with reference to FIG. 1.

As shown in FIG. 1, the power transmission and reception control system 1 is constructed to mutually supply direct-current power as necessary among battery servers provided in the respective consumers (four in FIG. 1). A consumer 10a is provided with a battery server 100a. Similarly, a consumer 10b, a consumer 10c, and a consumer 10d are provided with a battery server 100b, a battery server 100c, and a battery server 100d, respectively. Each of the battery servers 100a to 100d has a rechargeable battery provided inside or outside of each battery server.

The battery servers 100a to 100d are connected to a direct-current bus line 20 over which direct-current power is mutually supplied among the battery servers as necessary. Each of the battery servers 100a to 100d is provided with a bidirectional DC-to-DC converter that converts voltage of a battery and voltage of the direct-current bus line 20 from one level to another. The battery servers 100a to 100d are connected to a communication wire 30. When the battery servers 100a to 100d mutually supply direct-current power over the direct-current bus line 20, the battery servers 100a to 100d transmit and receive information over the communication wire 30. The communication wire 30 is illustrated as being wired in FIG. 1, but the communication wire 30 may be wireless.

The consumers 10a to 10d may be provided with solar panels 200a to 200d, respectively. Each of the solar panels 200a to 200d receives irradiation of sunlight and generates electric power. The solar panels 200a to 200d are configured so that the generated electric power may be stored in the respective batteries provided in the battery servers 100a to 100d. The electric power stored in the battery servers 100a to 100d may be generated by natural energy, such as wind or geothermal, other than sunlight.

The power transmission and reception control system 1 according to the present embodiment is characterized by a mechanism for arbitrating power transmission and reception among the battery servers 100a to 100d in such a way that only one of the battery servers 100a to 100d connected to the direct-current bus line 20 has the right to control the transmission and reception of direct-current power over the direct-current bus line 20. In other words, the power transmission and reception control system 1 according to the present embodiment is configured to have a mechanism that allows only the batter server having the control right among the battery servers 100a to 100d to instruct other battery servers to transmit power stored in their own batteries or to receive power for charging their own batteries, and that prevents a battery server having no control right from performing the power transmission and reception without permission or instruction.

In this way, only one of the battery servers 100a to 100d connected to the direct-current bus line 20 has the right to control the transmission and reception of direct-current power to and from other battery servers over the direct-current bus line 20. This makes it possible for the power transmission and reception control system 1 according to the present embodiment to avoid phenomena caused when the roles are simply shared between a master and a slave as described above and to efficiently manage the right to control the power transmission and reception of direct-current power. The power transmission and reception control system 1 according to the present embodiment efficiently manages the right to control the power transmission and reception of direct-current power, thereby keeping the order of objects to be controlled among the battery servers.

An overall configuration example of the power transmission and reception control system according to an embodiment of the present disclosure has been described with reference to FIG. 1. Subsequently, a functional configuration example of the power transmission and reception control system according to an embodiment of the present disclosure will be described.

FIG. 2 is a diagram illustrated to describe a functional configuration example of the power transmission and reception control system according to an embodiment of the present disclosure. A functional configuration example of the power transmission and reception control system according to an embodiment of the present disclosure will be described with reference to FIG. 2.

As shown in FIG. 2, the battery server 100a is configured to include a U-Agent 110a, an M-Agent 120a, a GM-Agent 130a, a C-Agent 140a, a DC-to-DC converter 150a, and a battery 160a. The battery servers 100b, 100c, and 100d have a configuration similar to the battery server 100a. The components that constitute the battery server 100a will be described.

As described in FIG. 2, the communication wire 30 is composed of two paths (channels) including a communication wire 30a and a communication wire 30b. The communication wires 30a and 30b may be physically different wired communication wires, or may be physically identical wired or wireless communication wires, which are divided logically for authentication, encryption, or the like. As shown in FIG. 2, the communication wire 30a allows the U-Agent 110a to communicate with other U-Agents 110b to 110d, and the M-Agent 120a to communicate with other M-Agents 120b to 120d. The communication wire 30b allows the GM-Agent 130a to communicate with other GM-Agents 130b to 130d, and the C-Agent 140a to communicate with other C-Agents 140b to 140d.

The power transmission and reception control system 1 according to the present embodiment uses separate communication wires for the U-Agent 110a and the M-Agent 120a and for the GM-Agent 130a and the C-Agent 140a. As a result, the U-Agent 110a and the M-Agent 120a are prevented from directly sending an instruction to the GM-Agent 130a and the C-Agent 140a. The GM-Agent 130a and the C-Agent 140a are also prevented from directly sending an instruction to the U-Agent 110a and the M-Agent 120a.

The U-Agent 110a is an example of a power transmission and reception requesting unit according to an embodiment of the present disclosure. The U-Agent 110a periodically checks the state of charge (SOC) in the battery 160a. If the state of charge in the battery 160a satisfies a predetermined condition, the U-Agent 110a requests the M-Agent 120a to receive power. The request to be sent from the U-Agent 110a to the M-Agent 120a may include a voltage value or current value upon reception of power, a time for receiving power (e.g., start time, end time, and duration), and a state of charge in the battery 160a that stops receiving power.

The U-Agent 110a refers to a scenario 170a to determine whether the state of charge in the battery 160a satisfies a predetermined condition. The scenario 170a describes a condition of the state of charge in the battery 160a, which is used to request the M-Agent 120a to receive power from the U-Agent 110a. The condition described in the scenario 170a may include contents of the U-Agent 110a requesting the M-Agent 120a to receive power if the state of charge in the battery 160a is lower than or equal to 20%.

The U-Agent 110a may have a function that edits contents of the scenario 170a based on the request from the user. The contents of the scenario 170a may be described in text, a markup language such as extensible markup language (XML), or a scripting language such as Lisp, Perl, and PHP. When the contents of the scenario 170a are described in a scripting language, the contents of the scenario 170a may be described in a set of functions.

The scenario 170a may be edited using a text editor, a dedicated editor, or a web browser. The U-Agent 110a may be configured so that a tool capable of editing the contents of the scenario 170a is operable.

When there is a request for supply of power from another battery server, the scenario 170a may describe a way of determining whether power transmission is permitted in response to the request depending on what condition is satisfied. For example, when there is a request for supply of power from another battery server, the scenario 170a may describe contents in which power transmission is permitted in response to the request under the condition that the state of charge in the battery 160a is greater than or equal to 80%. For example, when there is a request for supply of power from another battery server, the scenario 170a may describe contents in which power transmission is permitted in response to the request under the condition that the state of charge in the battery 160a is greater than or equal to 80% and the usage rate per hour of the power is less than or equal to 10%. In other words, the condition described in the scenario 170a may include not only the state of charge in the battery 160a but also the state of usage of electric power stored in the battery 160a.

The contents of the scenario are possible to be defined independently at the respective batteries. Accordingly, the condition in which power reception is requested or the condition in which power transmission is permitted in response to a request for supply of power from another battery server may be different for each battery server. The number of scenarios to be defined at each battery server is not limited to only one. The scenario referred to by the U-Agent 110a may be switched into another, depending on the situation.

The M-Agent 120a is an example of a power transmission and reception arbitration unit according to an embodiment of the present disclosure. When the M-Agent 120a receives a request for power reception from the U-Agent 110a, the M-Agent 120a inquires of the M-Agents 120b, 120c, and 120d of other battery servers about whether they are allowed to transmit power by performing communication among the M-Agents 120b, 120c, and 120d via the communication wire 30a. When the M-Agent 120a receives an inquiry about whether the M-Agent 120a is allowed to transmit power from the M-Agents 120b, 120c, and 120d of other battery servers, the M-Agent 120a responds that power is allowed to be transmitted or not.

When the M-Agent 120a receives an inquiry as to whether the M-Agent 120a is allowed to transmit power from the M-Agents 120b, 120c, and 120d of other battery servers, the M-Agent 120a may respond that power is allowed to be transmitted. In this case, if the GM-Agent 130a is not started, the M-Agent 120a inquires of the M-Agents 120b, 120c, and 120d of other battery servers about whether the GM-Agents 130b, 130c, and 130d are started over the communication wire 30a. As will be described in detail later, the GM-Agent 130a is started based on the start instruction from the M-Agent 120a and controls the operation of the DC-to-DC converters 150a to 150d of the battery servers.

In the power transmission and reception control system 1 according to the present embodiment, only one of the GM-Agents 130a to 130d is permitted to start. Thus, when the GM-Agent 130a is not started, the M-Agent 120a determines that the battery server 100a does not have the right to control the power transmission and reception and inquires of the M-Agents 120b, 120c, and 120d of other battery servers about whether they have the right to control the power transmission and reception, that is, whether they are starting or not, over the communication wire 30a. If there is a GM-Agent being started, the M-Agent 120a requests the GM-Agent being started to transmit and receive power through the M-Agent that causes the GM-Agent to start. For example, if the GM-Agent 130b is being started, the M-Agent 120a requests the M-Agent 120b to transmit and receive power through the M-Agent 120b.

On the other hand, if there is an inquiry about whether the power transmission is possible or not from the M-Agents 120b, 120c, and 120d of other battery servers, it may be responded that the power transmission is possible. In this case, if the GM-Agent 130a is started, the fact that the GM-Agent 130a is started is responded together.

The M-Agent 120a notifies the C-Agent 140a to follow an instruction only from a GM-Agent of the battery server having a control right. For example, the M-Agent 120a notifies identification information, which identifies a GM-Agent of the battery server having a control right, to the C-Agent 140a. when the C-Agent 140a receives the notification of identification information that identifies a GM-Agent of the battery server having a control right, the C-Agent 140a may ignore an instruction from a GM-Agent that contains identification information other than the identification information.

The GM-Agent 130a is an example of a power transmission and reception management unit according to an embodiment of the present disclosure. The GM-Agent 130a is started and activated according to a start instruction from the M-Agent 120a. The GM-Agent 130a is stopped and deactivated according to a stop instruction from the M-Agent 120a. The activated GM-Agent 130a controls the power transmission and reception by the DC-to-DC converters 150a to 150d through the C-Agents 140a to 140d over the communication wire 30b based on the request for the power transmission and reception from the M-Agents 120a to 120d. When the requested power transmission and reception is all ended, the GM-Agent 130a performs a process for releasing the control right. When the control right is released, the GM-Agent 130a is stopped and deactivated according to the stop instruction from the M-Agent 120a.

When there is a request for the power transmission and reception from the M-Agents 120a to 120d, the GM-Agent 130a acquires the power transmission capacity and power reception capacity of the respective battery servers 100a to 100d from the C-Agents 140a to 140d over the communication wire 30b. The GM-Agent 130a also calculates an amount of electric current that can be transmitted, from the total transmission current amount of the direct-current bus line 20. When the accumulated power transmission amount reaches a desired power transmission amount after power transmission is started, the GM-Agent 130a instructs the C-Agents 140a to 140d to stop transmitting power over the communication wire 30b.

The C-Agent 140a is an example of a power transmission and reception control unit according to an embodiment of the present disclosure. The C-Agent 140a controls the DC-to-DC converter 150a based on an instruction from the activated (i.e. having a control right) GM-Agent among the GM-Agents 130a to 130d. The C-Agent 140a receives the notification from the M-Agent 120a to follow the instruction only from the GM-Agent of the battery server having the control right. Thus, the C-Agent 140a controls the DC-to-DC converter 150a according to the instruction only from the GM-Agent of the battery server having the control right.

The C-Agent 140a periodically checks a parameter of the DC-to-DC converter 150a, and warns a target transmitter or receiver of power upon occurrence of an abnormality in the parameter of the DC-to-DC converter 150a.

The DC-to-DC converter 150a is connected between the battery 160a or the solar panel 200a and a local bus line 21a, and is connected to the DC-to-DC converters 150b to 150d of the other battery servers 100b to 100d over the direct-current bus line 20. The DC-to-DC converter 150a converts a direct-current power between the direct-current bus line 20 and the local bus line 21a under the control by the C-Agent 140a.

The U-Agent 110a operates according to the scenario 170a defined independently in the respective battery servers 100a to 100d. The M-Agent 120a, the GM-Agent 130a, and the C-Agent 140a operate according to a common policy 180 to all of the battery servers 100a to 100d. Thus, the M-Agent 120a, the GM-Agent 130a, and the C-Agent 140a are not allowed to operate according to different rules of the other battery servers 100b to 100d.

The contents of the policy 180 may be described in a text, a markup language such as extensible markup language (XML), or a scripting language such as Lisp, Perl, and PHP. When the contents of the policy 180 are described in a scripting language, the contents of the scenario 170a may be described in a set of functions.

The policy 180 may be edited using a text editor, a dedicated editor, or a web browser. As described above, the policy 180 is commonly referred to by all of the battery servers 100a to 100d, and thus it is desirable that the user is unable to edit easily, but it may be possible that the user can edit as necessary. The M-Agent 120a, the GM-Agent 130a, or the C-Agent 140a may edit the policy 180 based on the rule defined in the policy 180.

Examples of the contents described in the scenario 170a may include as follows:
  State of charge (SOC) level to request supply of power
  SOC level to determine that power is able to be supplied
  Method of predicting and calculating battery residual amount with power consumption cycle in a day
  Technique of predicting and calculating power generation amount in a week depending on acquisition of weather information
  Calculation of reduction in AC power usage depending on power interchange Examples of the contents described in the policy 180 may include a document version, date of modification, rule in modifying described contents, and respective rules defined for the M-Agents 120a to 120d, the GM-Agents 130a to 130d, and the C-Agents 140a to 140d.

Examples of rules defined for the M-Agents 120a to 120d may include as follows:
  Determination condition and decision procedure for acquiring control right
  Decision procedure for appeal from other devices
  Procedure of checking survival of battery server joined in the power transmission and reception control system 1
  Procedure of deleting registration of battery server previously joined in the power transmission and reception control system 1
  List and authentication information of members joined in the power transmission and reception control system 1

Examples of the determination condition for acquiring a control right may include a condition in which a control right can be acquired if there is even one M-Agent being in favor and a condition in which a control right can be acquired if a majority is in favor. Examples of the decision procedure for acquiring a control right may include a decision procedure in which a command is transmitted to other M-Agents in broadcast mode to acquire a control right and whether the control right is acquired is determined based on the response from the other M-Agent that returned an answer in a predetermined time. Similarly, examples of the decision procedure for appeal from other devices may include a decision procedure in which a command is transmitted to other M-Agents to acquire a control right and whether the control right is acquired is determined based on the contents of appeal from the other M-Agent that returned an answer in a predetermined time.

Examples of the procedure of checking survival of a battery server joined in the power transmission and reception control system 1 may include an example where the M-Agent of the battery server which is the last one to acquire a control right checks whether other battery servers are survived.

Examples of the procedure of deleting registration of a battery server previously joined in the power transmission and reception control system 1 may include a procedure of deleting registration information described in the policy 180 based on the command for requesting the deletion.

The list and authentication information of members joined in the power transmission and reception control system 1 are described in the policy 180, and thus the M-Agent can transmit various command only to the joined member and can add authentication information upon transmission of the command. Examples of the authentication information of a member may include address information of each battery server and an authentication key that is common to the battery servers.

Examples of rules defined for the GM-Agents 130a to 130d may include as follows:
  Information on connection state of battery servers as viewed from their position
  Method of calculating current capacity based on information on connection state of each battery server
  Control procedure and limitations of DC-DC converter
  Procedure from start to end for power transmission and reception in each battery server
  Abandonment or transfer procedure of control right after supply of power is stopped
  Processing procedure when abnormality is notified The direct-current power flows in the direct-current bus line 20, and thus the GM-Agents 130a to 130d are necessary to know the connection state of the battery servers 100a to 100d to the direct-current bus line 20 and to determine how to supply power based on position information of the battery servers 100a to 100d. The connection state of the battery servers 100a to 100d to the direct-current bus line 20 is described in the policy 180, and thus the GM-Agents 130a to 130d refer to the connection state to control the DC-to-DC converters 150a to 150d.

Examples of the procedure of controlling a DC-to-DC converter may include contents of an instruction sent to the DC-to-DC converter when direct-current power is converted. Examples of the limitations of a DC-to-DC converter may include a range in which power can be converted.

Examples of the procedure from start to end for power transmission and reception in each battery server may include a procedure of increasing electric current at the start of the power transmission or reception and a procedure of decreasing electric current at the end of the power transmission or reception.

Examples of the abandonment or transfer procedure of a control right after supply of power is stopped may include a procedure in which, for example, if there is another battery server that supplies power, the control right is transferred to the other battery server.

Examples of the processing procedure when abnormality is notified may include a procedure in which, if a batter server has a failure, the failed battery server is ignored and the processing proceeds.

Examples of rules defined for the C-Agents 140a to 140d may include as follows:
  Procedure of checking whether it is continued to be controlled by a GM-Agent of a battery server having the control right and processing procedure upon occurrence of abnormality
  Procedure of checking whether it is controlled simultaneously by a plurality of GM-Agents
  Processing procedure when it is controlled simultaneously by a plurality of GM-Agents
  Monitoring procedure of checking operations of a DC-to-DC converter and appropriately notifying the check results to a GM-Agent of a battery server having the control right Examples of the procedure of checking whether it is continued to be controlled by a GM-Agent of a battery server having a control right may include a procedure of checking whether it is controlled by the GM-Agent at predetermined time intervals. Examples of the processing procedure upon occurrence of abnormality may include a procedure of notifying the GM-Agent of a battery server having a control right that control by the GM-Agent is interrupted for more than a predetermined time.

Examples of the procedure of checking whether it is controlled simultaneously by a plurality of GM-Agents may include a procedure of checking whether it is controlled by a GM-Agent having identification information different from that notified from the M-Agent. Examples of the processing procedure when it is controlled simultaneously by a plurality of GM-Agents may include a procedure of ignoring the control by the GM-Agent having identification information different from that notified from the M-Agent and notifying a GM-Agent of a battery server having a control right that it is controlled simultaneously by a plurality of GM-Agents by dealing with the control from all of the GM-Agents as errors.

Examples of the monitoring procedure of checking operations of a DC-to-DC converter and appropriately notifying the check results to a GM-Agent of a battery server having the control right may include a procedure of checking a parameter of a DC-to-DC converter at predetermined time intervals and notifying a parameter of the DC-to-DC convert to a GM-Agent of a battery server having the control right.

The policy 180 defined as described above allows the C-Agents 140a to 140d to send an instruction to stop transmitting power to the DC-to-DC converters 150a to 150d immediately when the instruction from the GM-Agent violates the contents of the policy 180.

The description contents of the above scenario 170a or the policy 180 and examples of the description contents of the above scenario 170a or the policy 180 are not limited to those described above. The description contents of the scenario 170a or the policy 180 may be appropriately changed depending on the configuration of the power transmission and reception control system 1 or the configuration of each of the battery servers 100a to 100d.

The battery 160a is composed of a rechargeable secondary battery. The battery 160a may be charged with power generated by the solar panel 200a or power supplied from the commercial supply of power (not shown). The battery 160a may be charged with power supplied from other battery servers 100b to 100d as necessary. The power stored in the battery 160a may be supplied to electric appliances such as air conditioner, refrigerator, washing machine, television set, and microwave, provided in the consumer 10a. The power stored in the battery 160a may be supplied from the DC-to-DC converter 150a to other battery servers 100b to 100d depending on the request from the other battery servers 100b to 100d.

The battery servers 100a to 100d according to an embodiment of the present disclosure have the configuration as shown in FIG. 2, and thus only one battery server of them having a control right can control power transmission and reception of direct-current power to and from the other battery servers over the direct-current bus line 20. The battery servers 100a to 100d according to an embodiment of the present disclosure have the configuration as shown in FIG. 2, and thus it is possible to avoid phenomena caused when the roles are simply shared between a master and a slave as described above and to efficiently manage the right to control the power transmission and reception of direct-current power. The battery servers 100a to 100d according to an embodiment of the present disclosure have the configuration as shown in FIG. 2, and thus it is possible to efficiently manage the right to control the power transmission and reception of direct-current power, thereby keeping the order of objects to be controlled among the battery servers.

The direct-current bus line 20 or the local bus lines 21a to 21d are not limited to the particular configuration. For example, the direct-current bus line 20 or the local bus lines 21a to 21d may be configured as a direct-current single-phase three-wire bus line having two lines supplied with positive voltage and negative voltage, and a line connected to the ground.

The functional configuration example of the power transmission and reception control system according to an embodiment of the present disclosure has been described with reference to FIG. 2. Next, an exemplary operation of the power transmission and reception control system according to an embodiment of the present disclosure will be described.

(1.3. Exemplary Operation)

Tasks of the U-Agent 110a, the M-Agent 120a, the GM-Agent 130a, and the C-Agent 140a included in the battery server 100a according to an embodiment of the present disclosure will be described in that order.

FIG. 3 is a diagram illustrated to describe a task of the U-Agent 110a, the M-Agent 120a, the GM-Agent 130a, and the C-Agent 140a included in the battery server 100a according to an embodiment of the present disclosure.

The U-Agent 110a refers to the scenario 170a on a periodic basis by a timer and determines whether the state of the battery server 100a (e.g., SOC of the battery 160a) satisfies a condition defined in the scenario 170a. If it is determined that the state of the battery server 100a (e.g., SOC of the battery 160a) satisfies a condition defined in the scenario 170a, the U-Agent 110a requests the M-Agent 120a to receive power.

If the M-Agent 120a receives the request of power reception from the U-Agent 110a, the M-Agent 120a arbitrates the right to control transmission and reception of direct-current power between the M-Agent 120a and other M-Agents 120b to 120d. When there is any request for receiving power from other battery servers 100b to 100d, the M-Agent 120a similarly arbitrates the right to control transmission and reception of direct-current power between the M-Agent 120a and other M-Agents 120b to 120d.

The arbitration may cause the battery server 100a to be assumed to obtain a control right. The M-Agent 120a starts the GM-Agent 130a to activate the GM-Agent 130a. The M-Agent 120a notifies identification information that identifies the GM-Agent 130a to the C-Agent 140a. The activated GM-Agent 130a refers to the policy 180 and notifies information used to transmit and receive power on a periodic basis by a timer to the C-Agent 140a.

The C-Agent 140a controls the DC-to-DC converter 150a based on the notification from a GM-Agent (GM-Agent 130a in this example) having the identification information notified from the M-Agent 120a and perform the transmission and reception of power over the direct-current bus line 20. The C-Agent 140a refers to a parameter of the DC-to-DC converter 150a to check whether an abnormality in the parameter of the DC-to-DC converter 150a occurs on a periodic basis by a timer.

If there is an abnormality in the parameter of the DC-to-DC converter 150a, the C-Agent 140a notifies the occurrence of abnormality in the DC-to-DC converter 150a to the GM-Agent 130a. The C-Agent 140a checks the presence or absence of the occurrence of the notification from the GM-Agent 130 on a periodic basis by a timer. If the notification from the GM-Agent 130a does not occur for a predetermined time or more, the C-Agent 140a notifies the GM-Agent 130a that the notification from the GM-Agent 130a does not occur for a predetermined time or more. The C-Agent 140a may stop the DC-to-DC converter 150a from transmitting and receiving direct-current power after the C-Agent 140a notifies the GM-Agent 130a that the notification from the GM-Agent 130a does not occur for a predetermined time or more.

The U-Agent 110a, the M-Agent 120a, the GM-Agent 130a, and the C-Agent 140a included in the battery server 100a according to an embodiment of the present disclosure perform the respective tasks as shown in FIG. 3, and thus it is possible to keep the order of objects to be controlled among the battery servers.

Subsequently, operations performed by each of the U-Agent 110a, the M-Agent 120a, the GM-Agent 130a, and the C-Agent 140a included in the battery server 100a according to an embodiment of the present disclosure will be described in detail.

FIG. 4 is a flowchart illustrating an exemplary operation of the U-Agent 110a included in the battery server 100a according to an embodiment of the present disclosure. FIG. 5 is a flowchart illustrating an exemplary operation of the M-Agent 120a included in the battery server 100a according to an embodiment of the present disclosure. FIG. 6 is a flowchart illustrating an exemplary operation of the GM-Agent 130a included in the battery server 100a according to an embodiment of the present disclosure. FIG. 7 is a flowchart illustrating an exemplary operation of the C-Agent 140a included in the battery server 100a according to an embodiment of the present disclosure.

An exemplary operation of the U-Agent 110a will be described with reference to FIG. 4. The U-Agent 110a reads the scenario 170a defined in the battery server 100a (step S101) and determines whether the contents of the scenario 170a is changed (step S102). If the U-Agent 110a determines that there is no change in the contents of the scenario 170a (No in step S102), the U-Agent 110a waits until the contents of the scenario 170a is changed. On the other hand, if the U-Agent 110a determines that there is a change in the contents of the scenario 170a (Yes in step S102), the U-Agent 110a sends a control request to the M-Agent 120a based on the contents of the scenario 170a (step S103). The U-Agent 110a requests the M-Agent 120a to receive power, for example, when the state of charge of the battery 160a is lower than or equal to 20%, as the control request.

Next, an exemplary operation of the M-Agent 120a will be described with reference to FIG. 5. The M-Agent 120a reads the policy 180 defined in the battery server 100a (step S111), and checks whether there is a control request transmitted from the U-Agent 110a (step S112). The M-Agent 120a determines whether there is a control request transmitted from the U-Agent 110a (step S113). If M-Agent 120a determines that there is no control request transmitted from the U-Agent 110a (No in step S113), the M-Agent 120a waits until there is a control request transmitted from the U-Agent 110a. On the other hand, if M-Agent 120a determines that there is a control request transmitted from the U-Agent 110a (Yes in step S113), the M-Agent 120a determines whether the control request from the U-Agent 110a is acceptable (step S114). The determination of whether the control request is acceptable may be performed by the M-Agent 120a based on the contents described in the policy 180.

If the M-Agent 120a determines that the control request from the U-Agent 110a is unacceptable (No in step S114), the M-Agent 120a waits until another control request is transmitted from the U-Agent 110a. On the other hand, if the M-Agent 120a determines that the control request from the U-Agent 110a is acceptable (Yes in step S114), the M-Agent 120a performs arbitration of acquiring the right to control transmission and reception of direct-current power between the M-Agent 120a and the other M-Agents 120b to 120d of the battery servers 100b to 100d.

The arbitration of the acquisition of a control right between the M-Agent 120a and the other M-Agents 120b to 120d of the battery servers 100b to 100d is performed, and as a result of arbitration, if the battery server 100a has a control right, the M-Agent 120a causes the GM-Agent 130a to activate, and sends a control instruction for transmitting or receiving power to the GM-Agent 130a (step S116). When the M-Agent 120a sends a control instruction for causing the GM-Agent 130a to transmit or receive power in step S116, accordingly the M-Agent 120a notifies the C-Agent 140a of the identification information used to identify a GM-Agent 130a that acquires a control right. The other M-Agents 120b to 120d of the battery servers 100b to 100d also notify the respective C-Agents 140b to 140d of the identification information used to identify a GM-Agent 130a that acquires a control right.

Next, an exemplary operation of the GM-Agent 130a will be described with reference to FIG. 6. The GM-Agent 130a activated by the M-Agent 120a reads the policy 180 defined in the battery server 100a and the list of battery servers that constitute the power transmission and reception control system 1 (step S121), and checks whether a control instruction is transmitted from the M-Agent 120a (step S122).

The GM-Agent 130a determines whether there is a control instruction from the M-Agent 120a (step S123). If it is determined that there is a control instruction from the M-Agent 120a (Yes in step S123), the GM-Agent 130a controls the transmission and reception of power for the C-Agents 140a to 140d as a target (being described in the list that is read in step S121) of power transmission and reception control based on the control instruction (step S124). On the other hand, if it is determined by the GM-Agent 130a that there is no control instruction from the M-Agent 120a (No in step S123), the GM-Agent 130a determines whether the power transmission and reception control for the C-Agents 140a to 140d is all ended (step S125).

If the GM-Agent 130a determines that the power transmission and reception control for all of the C-Agents 140a to 140d is not ended (No in step S125), the GM-Agent 130a performs the power transmission and reception control for the C-Agents 140a to 140d (step S124). On the other hand, if the GM-Agent 130a determines that the power transmission and reception control for all of the C-Agents 140a to 140d is ended (Yes in step S126), the GM-Agent 130a notifies the C-Agents 140a to 140d of the end of the power transmission and reception control (step S126), and then a series of power transmission and reception control processing is ended.

If the GM-Agent 130a that acquires a control right ends the series of power transmission and reception control processing, the GM-Agent 130a transfers or abandon the control right based on the contents of the policy 180. If the GM-Agent 130a abandons the control right, the GM-Agent 130a is deactivated.

Subsequently, an exemplary operation of the C-Agent 140a will be described with reference to FIG. 7. The C-Agent 140a reads the policy 180 defined in the battery server 100a and starts a timer (step S131). The time started by the C-Agent 140a in step S131 is used to check whether the power transmission and reception control from the GM-Agent 130a (having a control right) is performed.

Next, the C-Agent 140a (having a control right) checks whether the power transmission and reception control is transmitted from the GM-Agent 130a (step S132). The C-Agent 140a determines whether there is a power transmission and reception control from the GM-Agent 130a (step S133). If it is determined that there is a power transmission and reception control from the GM-Agent 130a (Yes in step S133), the C-Agent 140a controls the DC-to-DC converter 150a based on the power transmission and reception control from the GM-Agent 130a (step S134). Specifically, the C-Agent 140a transmits direct-current power to the direct-current bus line 20 or receives direct-current power from the direct-current bus line 20 by setting a parameter of the DC-to-DC converter 150a to control the DC-to-DC converters 150a.

If the C-Agent 140a controls the DC-to-DC converter 150a based on the power transmission and reception control from the GM-Agent 130a, the C-Agent 140a resets the timer, which has been started in step S131 (step S135), and returns to the process for checking whether the power transmission and reception control is transmitted from the GM-Agent 130a in step S132.

On the other hand, if the C-Agent 140a determines that there is no power transmission and reception control from the GM-Agent 130a (No in step S133), the C-Agent 140a determines whether a value of the timer has lasted for a predetermined time or more (step S136). If it is determined that a value of the timer has not lasted for a predetermined time or more (No in step S136), the C-Agent 140a returns to the process for checking whether the power transmission and reception control is transmitted from the GM-Agent 130a in step S132. On the other hand, if it is determined that a value of the timer has lasted for a predetermined time or more (Yes in step S136), the C-Agent 140a resets the setting of the DC-to-DC converter 150a (step S137), and returns to the process for checking whether the power transmission and reception control is transmitted from the GM-Agent 130a in step S132.

The respective operations of the U-Agent 110a, the M-Agent 120a, the GM-Agent 130a, and the C-Agent 140a included in the battery server 100a according to an embodiment of the present disclosure have been described in detail.

When the battery server 100a according to an embodiment of the present disclosure operates in this way, in some cases, it is necessary to collect the states of the battery server 100a and present it to the user. The battery server 100a can obtain the right to collect data in which a data collection task for displaying a state of system is performed. Such a right to collect data is obtained by the arbitration between the battery server 100a and other battery servers 100b to 100d in a similar way to the right to control. When the GM-Agent 130a is not started, the right to collect data can be obtained through a process similar to the selection of the control right by the arbitration. When any other candidates to perform the data collection task are not found, the battery server 100a can obtain the right to collect data voluntarily.

The battery server 100a which acquires the right to collect data informs all other battery servers 100b to 100d connected thereto that battery server 100a acquires the right to collect data, and thus the battery server 100a is set as contact for inquiry in the case where information is obtained. The detailed procedure may be determined as described below.

When the user of the battery server 100a requests information of the entire system from the U-Agent 110a, the request is transmitted to the M-Agent 120a. The M-Agent 120a outputs the request of information collection to the battery server having a control right (e.g., the battery server 100b in the example). If there is no battery server having a control right when the request from the user is outputted, the request is outputted to a battery server having the right to collect data (e.g., the battery server 100c in the example). If there is also no battery server having the right to collect data, the battery server 100a declares to be a data collection device itself and waits to ask whether a response from other devices is yes or no for a predetermined time. If there is no negative response, the battery server 100a acquires the right to collect data and starts the GM-Agent 130a only using the right to collect data.

The GM-Agent 130a which acquires the right to collect data informs all of the C-Agents 140a to 140d that the GM-Agent 130a performs a data collection task. The C-Agents 140a to 140d stores an IP address of the battery server 100a operating as a data collection device. If there is a data display request from the U-Agents 110a to 110d, each of the battery servers 100b to 100d, which do not have the right to collect data, serves as a proxy server, and transfers the request to the battery server 100a operating as a data collection device. By transferring the request to the battery server 100a operating as a data collection device, each of the battery servers 100b to 100d that do not have the right to collect data can be shown to the user as if data collection is performed by own device.

The data collection task, which is performed by the battery server 100a operating as a data collection device, increases slightly power consumption because of use of a CPU installed in the battery server 100a. However, when the data collection task that is performed by the battery server 100a operating as a data collection device is performed, the power is not transferred in practice.

If a GM-Agent having a power transmission control right is started independently, the right to collect data is forwarded to the GM-Agent having a power transmission control right. In this case, a battery server including the GM-Agent having a power transmission control right withdraws from a DC grid (grid to which direct-current power is supplied over a direct-current bus line) or is continued to operate as a data collection device until the next GM-Agent is determined.

FIG. 8 is a diagram illustrated to describe a mode transition example of a GM-Agent. In other words, as shown in FIG. 8, the GM-Agent operates in a state of transition between three modes of idle mode, data collection mode, and DC grid control mode. The GM-Agent operates in idle mode during normal operation. When the GM-Agent acquires a control right by the arbitration between battery servers, the transition from idle mode to DC grid control mode is performed. When the GM-Agent acquires the right to collect data by the arbitration between battery servers, the transition to the data collection mode is performed. When the GM-Agent acquires a control right by the arbitration between battery servers, the transition from the data collection mode to the DC grid control mode is performed.

If the GM-Agent that is in DC grid control mode ends the power transmission and reception control, the transition from the DC grid mode to the data collection mode is performed. If the GM-Agent that is in the DC grid control mode withdraws from the DC grid, the transition from the DC grid control mode to the idle mode is performed. If the GM-Agent that is in the data collection mode similarly withdraws from the DC grid, the transition from the data collection mode to the idle mode is performed.

2. CONCLUSION

As described above, according to an embodiment of the present disclosure, there is provided a power transmission and reception control system 1 that performs transmission and reception of direct-current power between a plurality of battery servers over a direct-current bus line connected to the battery servers. According to an embodiment of the present disclosure, there are provided battery servers 100a to 100d in which only one battery server is allowed to have a control right and is allowed to control transmission and reception of direct-current power to and from other battery servers over a direct-current bus line 20.

The battery servers 100a to 100d according to an embodiment of the present disclosure are configured to have individual functions, that is, four tasks. An instruction is prevented from being sent directly from a lower task (task of requesting power to be received) to an upper task (task of controlling DC-to-DC converter).

The battery servers 100a to 100d according to an embodiment of the present disclosure can avoid phenomena caused when the roles are simply shared between a master and a slave as described above and can efficiently manage a control right for controlling the transmission and reception of direct-current power. The battery servers 100a to 100d according to an embodiment of the present disclosure efficiently manages the right to control the transmission and reception of direct-current power, thereby keeping the order of objects to be controlled among the battery servers.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, the hardware configuration of each function block shown in functional block diagrams allows a series of processes to be implemented in hardware.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

The present technology may be configured as below:
(1) A method of operating a first battery server for use with a first node of a power interchange system that distributes direct current (DC) power between a plurality of nodes, wherein each node of the plurality of nodes comprises a storage battery to store electrical energy and a battery server to control transmission of DC power from the storage battery of the node to one or more other nodes and to control receipt of DC power at the node from one or more storage batteries of one or more other nodes, wherein the method comprises:
monitoring a state of charge in a first storage battery of the first node and a usage rate of power by one or more electrical components of the first node; and
in response to detecting that the state of charge of the first storage battery and/or the usage rate of power satisfies one or more conditions, requesting that a master node of the power interchange system control transmission of power from another node of the plurality of nodes to the first node, wherein the master node is one of the plurality of nodes.

(2) The method according to (1), wherein detecting that the state of charge of the first storage battery and/or the usage rate of power satisfies one or more conditions comprises determining that the state of charge of the first storage battery is less than a threshold level.

(3) The method according to any one of (1) to (2), wherein requesting that the master node control transmission of power from another node to the first node comprises, in a case that the first node is the master node, controlling transmission of power from another node to the first node.

(4) The method according to (3), further comprising operating the first battery server of the first node to, in response to detecting that the state of charge of the first storage battery and/or the usage rate of power satisfies one or more conditions, carry out acts of:

determining whether one of the plurality of nodes is currently the master node;

in response to determining that none of the plurality of nodes is currently the master node, broadcasting at least one first message to the plurality of nodes nominating the first node as the master node; and in response to one or more messages being received at the first node from one or more nodes of the plurality of nodes other than the first node, configuring the first node to act as the master node of the power interchange system.

(5) The method according to (3), further comprising operating the first battery server of the first node to carry out an act of:

in response to determining that power is not presently being shared between nodes of the plurality of nodes and no node is currently requesting receipt of power from one or more other nodes of the plurality of nodes, configuring the first node to no longer act as the master node.

(6) The method according to (3), wherein controlling transmission of power from another node to the first node comprises transmitting at least one instruction to a second battery server of a second node of the plurality of nodes instructing the second battery server to transmit DC power from a second storage battery of the second node to the first node via a power bus of the power interchange system that interconnects the plurality of nodes.

(7) The method according to (6), wherein controlling transmission of power from another node to the first node further comprises:

receiving information regarding a state of charge of storage batteries of one or more nodes of the plurality of nodes other than the first node; and based on an evaluation of the state of charge for the one or more nodes other than the first node, selecting the second node to supply power to the first node.

(8) The method according to (3), further comprising operating the first battery server of the first node to carry out an act of:

in response to determining that no node is currently acting as the master node, arbitrating between the plurality of nodes which node will act as the master node.

(9) The method according to any one of (1) to (8), wherein requesting that the master node control transmission of power from another node to the first node comprises requesting that a second node of the plurality of nodes control transmission of power from another node to the first node.

(10) The method according to any one of (1) to (8), further comprising operating the first battery server of the first node to carry out acts of:

in response to receiving, from a second battery server of a second node of the plurality of nodes, a request to transmit power to the second node, determining whether the state of charge of the first storage battery and/or the usage rate of power satisfies one or more second conditions;

in response to determining that the state of charge and/or the usage rate satisfies the one or more conditions, transmitting at least one first message to the second battery server informing the second battery server that the first node is able to supply power; and in response to determining that the state of charge and/or the usage rate does not satisfy the one or more conditions, transmitting at least one second message to the second battery server informing the second battery server that the first node is not able to supply power.

(11) The method according to (10), further comprising operating the first battery server of the first node to carry out acts of:

in response to receiving a request from the master node to transmit power to the second node of the plurality of nodes, transmitting power via a power bus of the power interchange system that interconnects the plurality of nodes.

(12) The method according to (11), wherein transmitting the power via a power bus comprises controlling a power output from a DC-to-DC voltage converter of the first node.

(13) A battery server for use with a first node of a power interchange system that distributes direct current (DC) power between a plurality of nodes, wherein the battery server comprises:

a storage battery to store electrical energy;

at least one processor; and at least one computer-readable storage medium having encoded thereon executable instructions that, when executed by the at least one processor, cause the at least one processor to carry out a method comprising:

monitoring a state of charge in the storage battery and a usage rate of power by one or more electrical components of the first node; and in response to detecting that the state of charge of the storage battery and/or the usage rate of power satisfies one or more conditions, requesting that a master node of the power interchange system control transmission of power from another node of the plurality of nodes to the first node, wherein the master node is one of the plurality of nodes.

(14) The battery server according to (13), wherein requesting that the master node control transmission of power from another node to the first node comprises, in a case that the first node is the master node, controlling transmission of power from another node to the first node.

(15) The battery server according to (14), wherein the method further comprises:

in response to determining that no node is currently acting as the master node, arbitrating between the plurality of nodes which node will act as the master node.

(16) The battery server according to any one of (13) to (15), wherein the method further comprises:

in response to receiving, from a second battery server of a second node of the plurality of nodes, a request to transmit power to the second node, determining whether the state of charge of the first storage battery and/or the usage rate of power satisfies one or more second conditions;

in response to determining that the state of charge and/or the usage rate satisfies the one or more conditions, transmitting at least one first message to the second battery server informing the second battery server that the first node is able to supply power; and in response to determining that the state of charge and/or the usage rate does not satisfy the one or more conditions, transmitting at least one second message to the second battery server informing the second battery server that the first node is not able to supply power.

(17) A power interchange system for distributing direct current (DC) power between a plurality of nodes, the power interchange system comprising:
a power bus interconnecting the plurality of nodes;
a first node of the plurality of nodes comprising a first battery server, a first storage battery, and first electrical components; and
a second node of the plurality of nodes comprising a second battery server, a second storage battery, and second electrical components,
wherein the first battery server is programmed to carry out acts of:
monitoring a state of charge in a first storage battery of the first node and a usage rate of power by one or more first electrical components of the first node; and
in response to detecting that the state of charge of the first storage battery and/or the usage rate of power by the one or more first electrical components satisfies one or more conditions, requesting that a master node of the power interchange system control transmission of power from another node of the plurality of nodes to the first node, wherein the master node is one of the plurality of nodes.

(18) The power interchange system according to (17), wherein the second battery server is programmed to carry out acts of:
monitoring a state of charge in a second storage battery of the second node and a usage rate of power by one or more second electrical components of the second node; and in response to detecting that the state of charge of the second storage battery and/or the usage rate of power by the one or more second electrical components satisfies one or more conditions, requesting that the master node of the power interchange system control transmission of power from another node of the plurality of nodes to the second node.

(19) The power interchange system according to any one of (17) to (18), wherein both the first battery server and the second battery server are further configured to carry out an act of:
in response to determining that no node is currently acting as the master node, arbitrating between the plurality of nodes which node will act as the master node.

(20) The power interchange system according to any one of (17) to (19), wherein requesting that the master node control transmission of power from another node to the first node comprises, in a case that the first node is the master node, controlling transmission of power from another node to the first node.

REFERENCE SIGNS LIST 1 power transmission and reception control system
10a to 10d consumer
20 direct-current bus line
21a to 21d local bus line
30, 30a, 30b communication wire
100a to 100d battery server
150a to 150d DC-to-DC converter
160a to 160d battery
170a to 170d scenario
180 policy
200a to 200d solar panel

The invention claimed is:

1. A method of operating a battery server for use with a first node of a power interchange system that distributes direct current (DC) power between a plurality of nodes, wherein each node of the plurality of nodes comprises a storage battery to store electrical energy and a battery server to control transmission of DC power from the storage battery of the node to one or more other nodes and to control receipt of DC power at the node from one or more storage batteries of one or more other nodes, wherein the method comprises:
monitoring a state of charge in a first storage battery of the first node and a usage rate of power by one or more electrical components of the first node, wherein the first node is associated with a first consumer; and
in response to detecting that the state of charge of the first storage battery and/or the usage rate of power satisfies one or more conditions:
identifying a master node of the power interchange system, wherein the master node is one of the plurality of nodes, the plurality of nodes comprises a second node different than the first node, and the second node is associated with a second consumer different than the first consumer;
in response to determining, in the identifying, that no node is currently acting as the master node, arbitrating between the plurality of nodes which node will act as the master node; and
requesting that the master node control transmission of power from another node of the plurality of nodes to the first node.

2. The method of claim 1, wherein detecting that the state of charge of the first storage battery and/or the usage rate of power satisfies one or more conditions comprises determining that the state of charge of the first storage battery is less than a threshold level.

3. The method of claim 1, wherein requesting that the master node control transmission of power from another node to the first node comprises, in a case that the first node is the master node, controlling transmission of power from another node to the first node.

4. The method of claim 3, further comprising operating the battery server of the first node to, in response to detecting that the state of charge of the first storage battery and/or the usage rate of power satisfies one or more conditions, carry out acts of:
determining whether one of the plurality of nodes is currently the master node;
in response to determining that none of the plurality of nodes is currently the master node, broadcasting at least one first message to the plurality of nodes nominating the first node as the master node; and
in response to one or more messages being received at the first node from one or more nodes of the plurality of nodes other than the first node, configuring the first node to act as the master node of the power interchange system.

5. The method of claim 3, further comprising operating the battery server of the first node to carry out an act of:
in response to determining that power is not presently being shared between nodes of the plurality of nodes and no node is currently requesting receipt of power from one or more other nodes of the plurality of nodes, configuring the first node to no longer act as the master node.

6. The method of claim 3, wherein the battery server comprises a first battery server and wherein controlling transmission of power from another node to the first node comprises transmitting at least one instruction to a second battery server of the second node of the plurality of nodes instructing the second battery server to transmit DC power from a second storage battery of the second node to the first node via a power bus of the power interchange system that interconnects the plurality of nodes.

7. The method of claim 6, wherein controlling transmission of power from another node to the first node further comprises:
   receiving information regarding a state of charge of storage batteries of one or more nodes of the plurality of nodes other than the first node; and
   based on an evaluation of the state of charge for the one or more nodes other than the first node, selecting the second node to supply power to the first node.

8. The method of claim 1, wherein requesting that the master node control transmission of power from another node to the first node comprises requesting that the second node of the plurality of nodes control transmission of power from another node to the first node.

9. The method of claim 1, wherein the battery server comprises a first battery server and wherein the method further comprises operating the first battery server of the first node to carry out acts of:
   in response to receiving, from a second battery server of the second node of the plurality of nodes, a request to transmit power to the second node,
   determining whether the state of charge of the first storage battery and/or the usage rate of power satisfies one or more second conditions;
   in response to determining that the state of charge and/or the usage rate satisfies the one or more conditions, transmitting at least one first message to the second battery server informing the second battery server that the first node is able to supply power; and
   in response to determining that the state of charge and/or the usage rate does not satisfy the one or more conditions, transmitting at least one second message to the second battery server informing the second battery server that the first node is not able to supply power.

10. The method of claim 9, further comprising operating the first battery server of the first node to carry out acts of:
    in response to receiving a request from the master node to transmit power to the second node of the plurality of nodes, transmitting power via a power bus of the power interchange system that interconnects the plurality of nodes.

11. The method of claim 10, wherein transmitting the power via a power bus comprises controlling a power output from a DC-to-DC voltage converter of the first node.

12. A battery server for use with a first node of a power interchange system that distributes direct current (DC) power between a plurality of nodes, wherein the battery server comprises:
    a storage battery to store electrical energy;
    at least one processor; and
    at least one computer-readable storage medium having encoded thereon executable instructions that, when executed by the at least one processor, cause the at least one processor to carry out a method comprising:
    monitoring a state of charge in the storage battery and a usage rate of power by one or more electrical components of the first node, wherein the first node is associated with a first consumer;
    in response to detecting that the state of charge of the storage battery and/or the usage rate of power satisfies one or more conditions, requesting that a master node of the power interchange system control transmission of power from another node of the plurality of nodes to the first node, wherein the master node is one of the plurality of nodes, the plurality of nodes comprises a second node different than the first node, and the second node is associated with a second consumer different than the first consumer; and
    arbitrating between the plurality of nodes which node will act as the master node.

13. The battery server of claim 12, wherein requesting that the master node control transmission of power from another node to the first node comprises, in a case that the first node is the master node, controlling transmission of power from another node to the first node.

14. The battery server of claim 13, wherein the method further comprises:
    in response to determining that no node is currently acting as the master node, arbitrating between the plurality of nodes which node will act as the master node.

15. The battery server of claim 12, wherein the battery server comprises a first battery server and wherein the method further comprises:
    in response to receiving, from a second battery server of the second node of the plurality of nodes, a request to transmit power to the second node,
    determining whether the state of charge of the first storage battery and/or the usage rate of power satisfies one or more second conditions;
    in response to determining that the state of charge and/or the usage rate satisfies the one or more conditions, transmitting at least one first message to the second battery server informing the second battery server that the first node is able to supply power; and
    in response to determining that the state of charge and/or the usage rate does not satisfy the one or more conditions, transmitting at least one second message to the second battery server informing the second battery server that the first node is not able to supply power.

16. A power interchange system for distributing direct current (DC) power between a plurality of nodes, the power interchange system comprising:
    a power bus interconnecting the plurality of nodes;
    a first node of the plurality of nodes comprising a first battery server, a first storage battery, and first electrical components, wherein the first node is associated with a first consumer; and
    a second node of the plurality of nodes comprising a second battery server, a second storage battery, and second electrical components, wherein the second node is different than the first node and the second node is associated with a second consumer different than the first consumer,
    wherein the first battery server is programmed to carry out acts of:
    monitoring a state of charge in a first storage battery of the first node and a usage rate of power by one or more first electrical components of the first node;
    in response to detecting that the state of charge of the first storage battery and/or the usage rate of power by the one or more first electrical components satisfies one or more conditions, requesting that a master node of the power interchange system control transmission of power from another node of the plurality of nodes to the first node, wherein the master node is one of the plurality of nodes; and arbitrating between the plurality of nodes which node will act as the master node.

17. The power interchange system of claim 16, wherein the second battery server is programmed to carry out acts of:
monitoring a state of charge in a second storage battery of the second node and a usage rate of power by one or more second electrical components of the second node; and in response to detecting that the state of charge of the second storage battery and/or the usage rate of power by the one or more second electrical components satisfies one or more conditions, requesting that the master node of the power interchange system control transmission of power from another node of the plurality of nodes to the second node.

18. The power interchange system of claim 16, wherein both the first battery server and the second battery server are further configured to carry out an act of:
in response to determining that no node is currently acting as the master node, arbitrating between the plurality of nodes which node will act as the master node.

19. The power interchange system of claim 16, wherein requesting that the master node control transmission of power from another node to the first node comprises, in a case that the first node is the master node, controlling transmission of power from another node to the first node.

* * * * *